Figure 1:
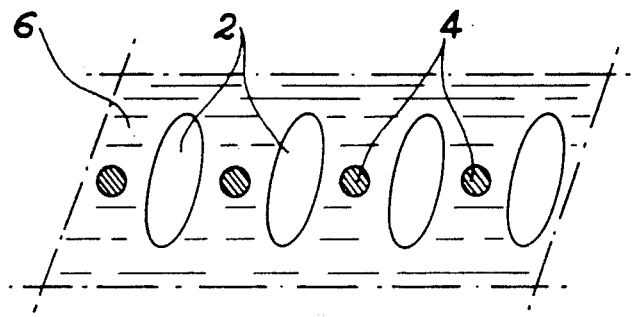

United States Patent [19]

Tabony

[11] Patent Number: 4,946,623
[45] Date of Patent: Aug. 7, 1990

[54] PROCESS FOR THE PRODUCTION OF A FERROMAGNETIC COMPOSITION, FERROMAGNETIC LIQUID CRYSTAL OBTAINED BY THIS PROCESS AND APPARATUS USING SAID LIQUID CRYSTAL

[75] Inventor: James Tabony, Villebon/Yvette, France

[73] Assignee: Commissariat a l'Energie Atomique, Paris, France

[21] Appl. No.: 113,289

[22] Filed: Oct. 26, 1987

[30] Foreign Application Priority Data

Nov. 7, 1986 [FR] France .................. 86 15593

[51] Int. Cl.$^5$ .................. B01J 13/00; C09K 19/52
[52] U.S. Cl. .................. 252/314; 252/309; 252/62.56; 252/583; 252/299.01; 252/299.2; 252/299.5; 350/350 R
[58] Field of Search ............ 428/1; 252/299.01, 583, 252/584, 62.56, 309, 310, 315.2, 314

[56] References Cited

U.S. PATENT DOCUMENTS

| | | | |
|---|---|---|---|
| 3,531,413 | 9/1970 | Rosensweig | 252/310 |
| 3,764,540 | 10/1973 | Khalafalla et al. | 252/309 X |
| 4,234,437 | 11/1980 | Friberg | 252/62.51 |
| 4,356,098 | 10/1982 | Chagnon | 252/62.51 |
| 4,416,751 | 11/1983 | Berkowitz et al. | 252/309 X |
| 4,599,184 | 7/1986 | Nakatani et al. | 252/62.51 |
| 4,652,257 | 3/1987 | Chang | 604/52 |
| 4,664,841 | 5/1987 | Kitahara et al. | 252/309 |
| 4,783,150 | 10/1988 | Tabony | 350/351 |
| 4,822,535 | 4/1989 | Ekman et al. | 252/310 X |

FOREIGN PATENT DOCUMENTS

| | | |
|---|---|---|
| 2462725 | 2/1981 | France . |
| 7919554 | 2/1981 | France . |
| 61-246262 | 11/1986 | Japan . |
| 649657 | 2/1979 | U.S.S.R. . |
| 1361004 | 7/1974 | United Kingdom . |
| 1391285 | 4/1975 | United Kingdom . |

OTHER PUBLICATIONS

Derwent Abstract 79-83764B/46 9/3/76.
Gan, L. M.; Chew, C. H.; Friberg, S. E. J. Macro Mol. Sci. Chem., A19 (5), pp. 739–756 (1983).
Molecular Crystals . . . "The Structure of lyotrobic-nematic . . . " K. Radley vol. 44, 227, 1978.
Chemical Abstracts "Internal Structure of oil-in-water" . . . Fukushima . . . vol. 101, No. 22, Nov. 26, 1984.

Primary Examiner—John S. Maples
Assistant Examiner—Richard Treanor
Attorney, Agent, or Firm—Ladas & Parry

[57] ABSTRACT

There is provided a process for the production of a composition and, in particular, of a ferromagnetic liquid crystal. The process comprises (1) forming a microemulsion by dispersing an aqueous solution containing ferrous cations and ferric cations in an oil in the presence of a surfactant and a co-surfactant such that the aqueous solution becomes a liquid phase dispersed in ther oil as a discontinuous liquid phase, and (2) reacting the ferrous cations and ferric cations with a chemical compound to form ferromagnetic particles in situ in the aqueous solution. According to the invention, this process is useful in forming magnetite particles ($Fe_3O_4$) from 1 to 100 mm. in size.

16 Claims, 1 Drawing Sheet

U.S. Patent    Aug. 7, 1990    4,946,623

PROCESS FOR THE PRODUCTION OF A FERROMAGNETIC COMPOSITION, FERROMAGNETIC LIQUID CRYSTAL OBTAINED BY THIS PROCESS AND APPARATUS USING SAID LIQUID CRYSTAL

DESCRIPTION

The present invention relates to a process for the production of a liquid ferromagnetic composition, which can be a ferrofluid or a ferromagnetic liquid crystal.

It more particularly applies to any optical apparatus using a liquid crystal, such as an image converter, a display means for alphanumeric characters or more complex images which is electrically or magnetically controllable, magnetic bubble devices, such as bubble memories, magnetic microcircuits and magnetic keys, devices for measuring weak magnetic fields, etc.

More specifically, the present invention relates to a process for the production of a ferromagnetic microemulsion. A microemulsion is a homogeneous, stable solution of two immiscible liquids, such as water and oil, in which the water or oil is present in extremely divided form and in particular in the form of droplets with a size between 1 and 100 nm. A surfactant ensures the dispersion of the water in the oil or the oil in the water.

The presently known processes for the production of ferromagnetic anisotropic liquids consist of adding to anisotropic liquids finely divided ferromagnetic particles, the size of said particles generally being between 10 and 500 nm. As examples of processes for the production of ferromagnetic anisotropic liquids, particular reference is made to those described in British patents 1 361 004 and 1 391 285.

These processes only make it possible to obtain a relatively small quantity of ferromagnetic particles present in the anisotropic liquid.

The presently known processes, particularly for the production of ferrofluids, lead to costly ferromagnetic compositions, in view of the treatment processes (grinding, screening, etc.) and equipment required for producing particles of small size. Moreover, they do not permit the production of liquid crystals having intrinsic ferromagnetic properties.

The presently known compositions having both the properties of liquid crystals and ferromagnetic properties are in particular compositions formed from a mixture of water, amphiphilic molecules and at least one compound chosen in the group including alcohols and mineral salts of alkali metals and in which the ferromagnetic particles are dispersed. Such a composition is more particularly described in FR-A-2 462 725.

FIG. 1 diagrammatically shows the structure of a prior art ferromagnetic composition. As is shown in FIG. 1, the constituents of the composition are grouped into aggregates 2 in the form of elongated or flattened cylinders, which can be oriented by a surface treatment or under the action of an external magnetic field. The presence of ferromagnetic particles 4 distributed between the aggregates 2 in the continuous liquid phase 6 facilitates the orientation of the aggregates under the effect of a coupling of the ferromagnetic particles 4 and the said aggregates.

In view of the fact that the ferromagnetic particles 4 are located in the continuous phase 6 between the aggregates 2, these compositions are not true ferromagnetic liquid crystals. The compositions are not homogeneous mixtures and do not display the optical properties of "true" liquid crystals.

In order to produce ferromagnetic liquid crystals, it would initially be possible to conceive adding to known liquid crystals a certain quantity of ferromagnetic liquid or ferrofluid obtained by prior art processes. However, this process suffers from a serious disadvantage. Thus, the addition of a ferromagnetic liquid quantity exceeding 2% by volume destroys the liquid crystal properties of the composition, so that it offers little practical interest.

The present invention relates to a process for producing a ferromagnetic composition making it possible to obviate the aforementioned disadvantages. In particular, this process is relatively simple and makes it possible to obtain extremely fine ferromagnetic particles, as well as the production of liquid crystals having intrinsic ferromagnetic properties. Moreover, the products obtained are inexpensive.

More specifically, one of the objects of the invention is a process for producing a ferromagnetic composition, characterized in that it comprises chemically, photochemically or thermochemically reacting a compound soluble in a liquid phase dispersed in a continuous liquid phase by means of a surfactant, in the presence of a co-surfactant, in order to form ferromagnetic particles in the dispersed liquid.

This process makes it possible to obtain ferromagnetic colloidal particles, whose quantity by volume can represent 50% and even more of the total composition. Thus, it makes it possible to obtain high density dispersions of ferromagnetic particles, which is difficult to realize with the prior art processes. The ferromagnetic compositions obtained then have superior magnetic properties to those of the prior art.

Another object of the invention is a process for producing a lyotropic ferromagnetic liquid crystal, characterized in that it comprises chemically, photochemically or thermochemically reacting a compound soluble in a liquid phase dispersed in a continuous liquid phase by means of a surfactant, in order to form ferromagnetic particles in the dispersed liquid phase.

The inventive process is relatively simple to realize and permits the production on the one hand of a ferromagnetic liquid or ferrofluid and on the other hand of ferromagnetic liquid crystals. The size of the ferromagnetic particles varies from 1 to 100 nm.

According to the invention, the dispersed liquid phase can be a polar liquid and the continuous liquid phase can be oil. Conversely, the dispersed phase can be oil and the continuous phase a polar liquid.

Preferably, the polar liquid used is water. However, it is also possible to use other polar liquids, such as ammonia, ethylene glycol, formamide, glycerol, ethanol, a mixture of these polar liquids or an aqueous solution thereof.

In order to vary the ionic forces between the oil, the polar liquid and the surfactant, an electrolyte can be added to the polar liquid. This electrolyte represents 1 to 40% by weight of the polar liquid and preferably 1 to 10% by weight.

This electrolyte is in particular an inorganic salt, such as an alkali metal salt, e.g. sodium chloride, sodium bromide, sodium sulphate, potassium chloride or potassium bromide. This electrolyte can also be a basic hydroxide, such as ammonium hydroxide. Finally, it is also possible to use an organic salt, such as $N(CH_3)_4Br$ as the electrolyte.

According to the invention, it is possible to use any type of surfactant, namely anionic, cationic or nonionic surfactants. These surfactants are in particular fatty acid salts with a long hydrocarbon or fluorocarbon chain, long chain amine salts, quaternary ammonium halides having at least one long chain hydrocarbon substituent, alkyl sulphates or sulphonates of an alkali metal and phospholipids. Preferably, the carbon chain contains 5 to 20 carbon atoms. Moreover, the carbon chain can be saturated or unsaturated.

A possible saturated carbon chain surfactant is sodium dodecyl sulphate and tetradecyl trimethyl ammonium bromide. The unsaturated carbon chain surfactant can be potassium oleate.

It is also possible to use multiple chain compounds, such as e.g. sodium bis-(2-ethylhexyl)-sulphosuccinate, known as A.O.T.

It is also possible to use commercial soaps and sulphonated petroleum oils, such as sodium hexyl benzosulphonate.

Potassium oleate, A.O.T. and sulphonated petroleum oils are very good surfactants having the advantage of being industrially produced in large quantities and at a very low price.

With the exception of certain surfactants, such as A.O.T., which serve both as a surfactant and as a co-surfactant, it is necessary to associate with the surfactant a co-surfactant.

The co-surfactants usable in the present invention are monohydroxylated or polyhydroxylated alcohols, amines, amino alcohols, carboxylic acids and ethers, said compounds having a short carbon chain, or a mixture thereof. The length of the carbon chain contains in particular 1 to 20 carbon atoms.

The preferred co-surfactants are a monoalcohol such as ethanol, butanol, pentanol, hexanol, heptanol, octanol, decanol or a mixture thereof. Advantageously use is made of butanol, pentanol or hexanol.

Alcohols which are polar liquids can serve both as a co-surfactant and as a polar liquid according to the invention.

According to the invention, the oil used is a saturated or unsaturated cyclic hydrocarbon, as well as fluorine derivatives of such hydrocarbons. The carbon chain of these hydrocarbons contains 5 to 30 carbon atoms.

The preferred hydrocarbon is an alkane or an aromatic derivative. For example it is possible to use benzene, toluene, cyclohexane, octane and decane.

According to the invention, the ferromagnetic particles formed in situ in the dispersed liquid are in particular particles of iron, cobalt, chromium dioxide, nickel, ferric oxide, magnetite or cobalt oxide. Preferably the ferromagnetic particles are particles of magnetite ($Fe_3O_4$).

The in situ production of magnetite particles can be performed in simple manner by reducing ferrous and ferric ions in the presence of a basic hydroxide, such as ammonium hydroxide. In this particular case, the ammonium hydroxide also serves as an electrolyte.

The particles of iron and cobalt can be formed by decomposition by heating or ultraviolet radiation of the corresponding carbonyl compounds, said compounds being dissolved in a solvent, such as toluene. The latter can then constitute the oil of the microemulsion according to the invention.

The oils, surfactants and co-surfactants, the ferromagnetic particles referred to hereinbefore and the water are readily commercially available at low price. Thus, such constituents make it possible to obtain relatively easily ferrofluid and ferromagnetic liquid crystals.

The process according to the invention makes it possible to obtain lyotropic liquid crystals having intrinsic ferromagnetic properties. At present, no such liquid crystals exist.

Thus, the invention relates to a lyotropic ferromagnetic liquid crystal containing 1 to 90% by weight of surfactant, 1 to 90% by weight of co-surfactant, 1 to 97% by weight of oil and 1 to 97% by weight of a polar liquid, the ratio of the co-surfactant mass to the surfactant mass being below 2 and the four constituents form elongated aggregates dispersed in a continuous liquid phase, whose length exceeds the distance separating two consecutive aggregates, said aggregates containing ferromagnetic particles.

The aggregates can be in the form of plates, rods, ellipsoids or elongated cylinders, whose length varies between 3 and more than 300 nm. According to the invention, the distance separating two consecutive aggregates is between 2 and 200 nm and is preferably between 4 and 20 nm.

The use of ferromagnetic liquid crystals according to the invention makes it possible, compared with liquid crystals having no ferromagnetic properties, to increase the optical birefringence and magnetic and dielectric anistropy of the liquid crystals, which is of great interest in the field of in particular electrically controlled liquid crystal display means. In particular, the electric fields necessary for modifying the orientation of the aggregates are much weaker.

The liquid crystals according to the invention can also be used in optical devices, particularly magnetically controlled display means. In view of the fact that the quantity of ferromagnetic particles can exceed 50% by volume of the total composition, the magnetic fields necessary for the orientation of the aggregates are much weaker than those used in the liquid crystals to which are added ferromagnetic particles, as in FR-A-2 462 725.

The ferromagnetic liquid crystals according to the invention are perfectly suitable for both alphanumeric and matrix display purposes, due to the fact that they have a relatively low viscosity. Their viscosity is between 0.1 and 100 centipoises and is preferably between 1 and 30 centipoises. Thus, their low viscosity makes it possible to easily orient the aggregates in a desired direction.

The liquid crystals according to the invention also have a good memory effect, unlike in the case of a large number of known liquid crystals, which makes it unnecessary to perform numerous refreshing operations. Thus, they remain oriented for a long time, even after eliminating the electrical or magnetic excitation.

The ferromagnetic liquid crystals according to the invention can be used in all the presently known liquid crystal devices.

The oil, the polar liquid optionally containing an electrolyte, the surfactants and co-surfactants, as well as the ferromagnetic particles of the liquid crystals according to the invention are in particular those described hereinbefore. Advantageously, the liquid crystals according to the invention contain 1 to 45 and preferably 5 to 20% by weight of surfactant, 1 to 45 and preferably 1 to 20% by weight of co-surfactant, 1 to 97 and preferably 1 to 93% by weight of oil and 1 to 97 and preferably 1 to 93% by weight of polar liquid.

In the case of ferromagnetic liquid crystals according to the invention, whereof it is wished to control the orientation of the aggregates by applying an electric field, it is necessary in the case where the polar liquid is water for the quantity by volume of the latter to be below 50%, in order to prevent electrolysis of the latter and therefore the destruction of the properties of the liquid crystal.

According to the invention, the electrically controllable ferromagnetic liquid crystals are in particular those containing 1 to 45 and preferably 5 to 20% by weight of surfactant, 1 to 45 and preferably 1 to 20% by weight of co-surfactant, 50 to 97 and preferably 50 to 93% by weight of oil and 1 to 48 and preferably 1 to 44% by weight of water.

The ferromagnetic liquid crystals according to the invention are generally usable at ambient temperature. However, in the case of an excessively viscous liquid crystal, the latter can be heated to a temperature 10° to 15° C. above ambient temperature.

During the use of liquid crystals according to the invention in cold areas of the world, said liquid crystals can contain an anti-freeze and the latter is in particular constituted by ethylene glycol.

In an electrically controllable device using a ferromagnetic liquid crystal according to the invention, it is possible to facilitate the electrical control of said liquid crystal by introducing a preferably linear molecule and/or a highly electrically charged molecule, such as polypeptides, polyelectrolytes and polysaccharides.

It is also possible to add to the liquid crystals according to the invention optically active molecules, such as brucine, cholesterol or derivatives thereof, so that the liquid crystals have a cholesteric phase.

These additives represent less than 50 and preferably less than 10% by weight of the composition.

In order to simplify the presently known liquid crystal optical devices, as well as the control thereof, by the elimination of the crossed polarizers generally used on either side of the liquid crystal film, dichroic dyes can be introduced into the liquid crystal according to the invention.

Although the ferromagnetic liquid crystals according to the invention are perfectly suitable for presently known display means, said liquid crystals can be used in all fields generally employing liquid crystals.

The description refers to the following drawings, wherein show:

FIG. 1, already described, diagrammatically the structure of a prior art ferromagnetic composition.

Figure 2:
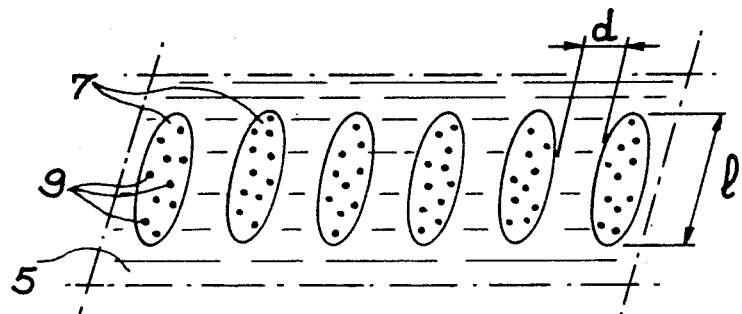

FIG. 2 diagrammatically the structure of a ferromagnetic liquid crystal according to the invention.

Figure 3:
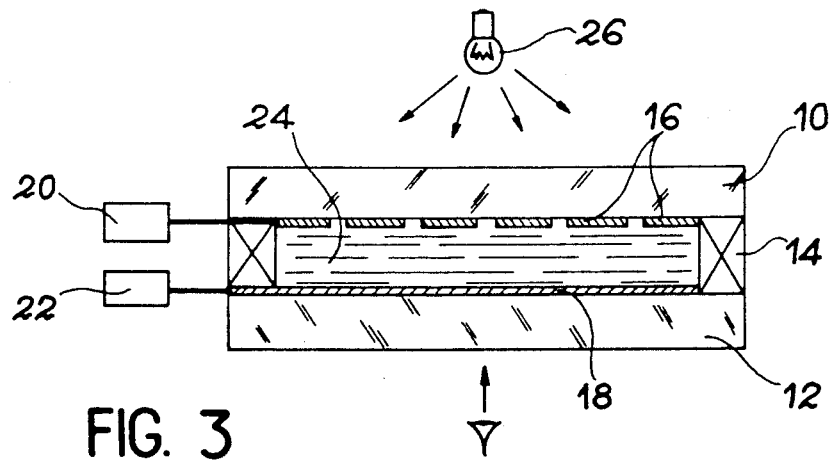

FIG. 3 diagrammatically a display means containing a ferromagnetic liquid crystal according to the invention.

On referring to FIG. 2, the ferromagnetic liquid crystals have a continuous liquid phase 1, which is water or oil containing aggregates 7, respectively of oil or water. These elongated aggregates have a length l between 3 and more than 300 nm and are separated by a distance d of 2 to 300 nm less than their length l. The dispersion of the aggregates is ensured by a surfactant and a co-surfactant.

According to the invention, the aggregates 7 contain ferromagnetic particles 9, especially of magnetite, which give the ferromagnetic property to the liquid crystals. These ferromagnetic liquid crystals can be used in an electrically controlled display means, as shown in FIG. 3.

This means comprises a tight cell formed by two transparent insulating walls 10, 12, which face one another and which are in particular made from glass. A tight joint 14 makes it possible to join the walls 10 and 12 at their edges.

A transparent metallic deposit 16, e.g. of tin oxide, is placed on the inner face of insulating wall 10. Metal deposit 16 serves as an electrode and has an appropriate structure for display purposes (matrix of dots, segments, etc.). Furthermore, the inner face of wall 12 is coated with a transparent metal deposit 18, e.g. of tin oxide and serves as the counterelectrode.

Control and supply circuits 20, 22 respectively connected to conductive deposits 16, 18 make it possible to apply to the terminals of the ferromagnetic liquid crystal 24, contained in the tight cell, voltages appropriate for the electrical excitation of the liquid crystal. Liquid crystal 24 contains dichroic dyes.

A lamp 26 located on the opposite side to the observation side completes the means. The control and supply circuits of the means are those generally used in this field.

The ferromagnetic liquid crystals according to the invention have an optical birefringence which can be modified under the effect of an electric field. Initially and prior to the application of an electric field, the aggregates of these liquid crystals have a random orientation distribution. The application of an electric field makes it possible to orient these aggregates in the same direction.

In an illustrative and non-limitative manner, two examples will now be given of the realization of the process according to the invention.

EXAMPLE 1

30 g of potassium oleate (surfactant) are dissolved in 100 ml of dodecane (oil) and 40 ml of hexanol (co-surfactant). To 10 ml of the thus obtained solution are added 1 ml of 1.7 molar aqueous $FeCl_2$ solution and 1 ml of a 1.7 molar aqueous $FeCl_3$ solution.

7 ml of 12M ammonium hydroxide are added to the solution obtained and then the latter is mixed vigorously for approximately 5 minutes. A period of several hours is then necessary for completing the chemical reaction. The mixture obtained is separated into two phases, an upper ferrofluid phase and a lower aqueous phase.

The ferrofluid phase is then eliminated by decanting. It contains a high density of ferromagnetic colloidal particles and can be highly magnetizable.

In this example, the reduction of ferric and ferrous ions by ammonium hydroxide has made it possible to produce in situ magnetic particles ($Fe_3O_4$), said particles being present in the dispersed liquid then constituted by water.

EXAMPLE 2

A first solution is formed by dissolving 0.3 g of tetradecyl trimethyl ammonium bromide (surfactant) in 2 ml of cyclohexane (oil) and 0.05 ml of pentanol (co-surfactant). To the mixture obtained is added 0.2 ml of a 1.7 molar aqueous $FeCl_3$ solution. The mixture is then stirred for several seconds until the aqueous phase is dispersed in the cyclohexane.

In parallel, a second solution is prepared, which contains the same proportions of cyclohexane, pentanol and tetradecyl trimethyl ammonium bromide, to which is added 0.2 ml of a 1.7 molar aqueous $FeCl_2$ solution in place of the $FeCl_3$ solution.

Finally, a third solution is prepared, which contains 1.8 g of tetradecyl trimethyl ammonium bromide, 12 ml of cyclohexane, 0.3 ml of pentanol and 1.2 ml of 12M ammonium hydroxide.

The three aforementioned solutions are then mixed. The chemical reaction, which is complete after a few minutes, leads to a chestnut coloured ferromagnetic liquid crystal having optical birefringence properties much better than those of a similar composition not containing ferromagnetic particles in the dispersed phase, in this case water.

Apart from in the presently known liquid crystal devices, the ferromagnetic liquid crystals according to the invention can also be used in bubble memories, the dispersed phase representing the propagation units of the magnetic bubbles.

I claim:

1. A process for producing a ferromagnetic composition consisting essentially of:
   (i) forming a micro-emulsion by:
      (a) dispersing an aqueous solution containing ferrous cations and ferric cations in
      (b) an oil,
      (c) in the presence of a surfactant and a co-surfactant such that said aqueous solution becomes a disperse liquid phase comprising aqueous aggregates dispersed in said oil which is a continuous liquid phase;
      said aqueous solution consisting of water or a saline solution and said oil being a hydrocarbon selected from the group of hydrocarbons consisting of saturated and unsaturated hydrocarbons having 5 to 30 carbon atoms and including both cyclic and non-cyclic hydrocarbons, and fluorine derivatives of such hydrocarbons, and
   (ii) said ferrous cations and ferric cations a chemical compound to form ferromagnetic particles in situ in said aqueous aggregates such that the size of said particles is limited by the size of the aggregates in which they are formed.

2. A process according to claim 1, wherein the chemical compound is a basic hydroxide.

3. A process according to claim 2, wherein said basic hydroxide is ammonium hydroxide.

4. A process according to claim 1, wherein said surfactant is chosen from the group consisting of fatty acid salts having a hydrocarbon or fluorocarbon chain having 5 to 20 carbon atoms, quaternary ammonium halides and alkali metal alkyl sulphates.

5. A process according to claim 4, wherein said surfactant is chosen from the group consisting of tetradecyl trimethyl ammonium bromide and potassium oleate.

6. A process according to claim 1, wherein the surfactant is sodium bis-(2-ethylhexyl)-sulphosuccinate.

7. A process according to claim 1, wherein said co-surfactant is selected from the group consisting of monohydroxylated or polyhydroxylated alcohols, amines, amino alcohols, carboxylic acids and ethers and or a mixture thereof, said compounds having a carbon chain having from 1 to 20 carbon atoms.

8. A process according to claim 7, wherein the co-surfactant is formed by at least one alcohol.

9. A process according to claim 8, wherein said alcohol is selected from the group consisting of butanol, pentanol, and hexanol.

10. A process according to claim 1, wherein said saline solution comprises an alkali metal salt or a basic hydroxide.

11. A process according to claim 10, wherein said saline solution contains ammonium hydroxide.

12. A process according to claim 10, wherein the alkali metal salt is selected from the group consisting of sodium chloride, sodium bromide, sodium sulphate, potassium chloride, and potassium bromide.

13. A process according to claim 1, wherein said hydrocarbon is chosen from the group consisting of benzene, toluene, cyclohexane, octane, decane, and mixtures thereof.

14. A process according to claim 1, wherein the oil is dodecane, the surfactant is potassium oleate, and the co-surfactant is hexanol.

15. A process according to claim 1, wherein the oil is cyclohexane, the surfactant is tetradecyl trimethyl ammonium bromide, and the co-surfactant is pentanol.

16. A process according to claim 15, wherein the particles formed are magnetite particles ($Fe_3O_4$) and the aggregates are of a size which limit such particles to between 1 to 100 nm in size.

* * * * *

UNITED STATES PATENT AND TRADEMARK OFFICE
CERTIFICATE OF CORRECTION

PATENT NO. : 4,946,623

DATED : August 7, 1990

INVENTOR(S) : James Tabony

It is certified that error appears in the above-identified patent and that said Letters Patent is hereby corrected as shown below:

Column 7, line 41 before "said", insert --adding to--

Column 7, line 42 after "compound", insert --so as--

Signed and Sealed this

Twenty-first Day of July, 1992

Attest:

DOUGLAS B. COMER

*Attesting Officer*  *Acting Commissioner of Patents and Trademarks*